Patented Jan. 20, 1942

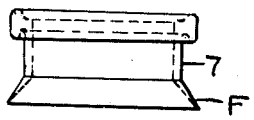
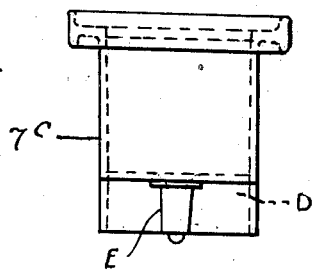
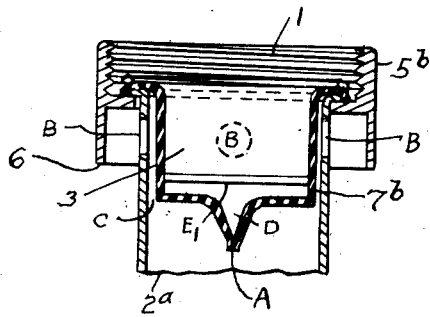
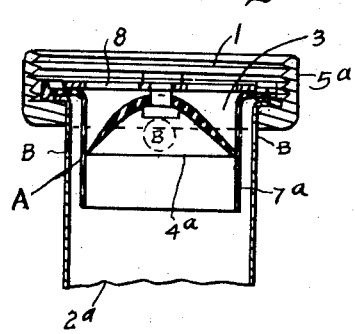
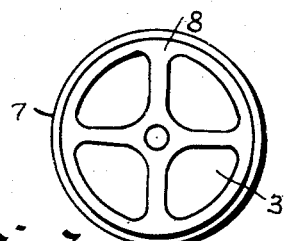
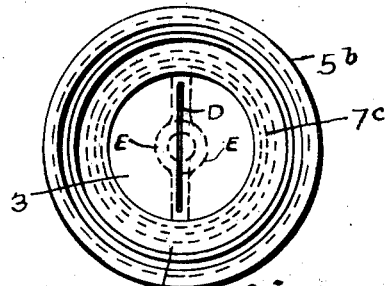
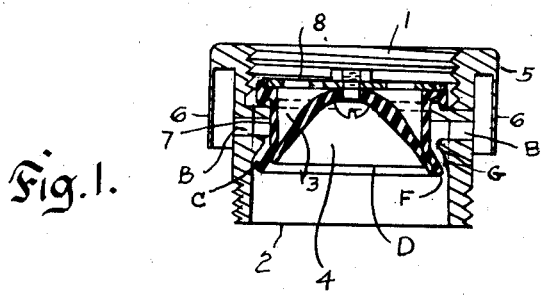

2,270,737

UNITED STATES PATENT OFFICE 2,270,737

SIPHON BREAKER AND VALVE

Jesse D. Langdon, Los Angeles, Calif.

Application July 26, 1940, Serial No. 347,673

3 Claims. (Cl. 137—69)

This application is a continuation in part of application Serial No. 326,090, dated March 26, 1940, for Siphon breakers and valves.

My invention relates primarily to siphon preventing devices to be attached to the outlet of valves of various descriptions or to a supply line where the outlet side is immersed in water or is attached to any water supply conduit which communicates with a container or other potential source of contamination in case a vacuum is created in the supply side of said conduit.

The primary object of the invention is to prevent the ingress of contaminated fluid into the supply line by the provision of check valve means which prevents the ingress of fluid in one direction and permits the egress of fluid in the opposite direction.

Another object is the provision of check valve means comprising parallel lips made of material flexible and pliable enough to allow said lips to be forced together by pressure exerted from one direction and forced apart by pressure exerted from the opposite direction.

Another object is to provide flexible lips adapted to engage one another and tend to wrap around a foreign object inserted or lodged between said lips and to prevent leakage or minimize the bypassing of fluid around said object when pressure is exerted toward the distal end of said lips.

Another object is to provide a collapsible and expansible check valve means capable of opening and closing ports provided through the wall of the casing surrounding said check valve means.

A still further object is to provide slotted check valve means to permit the egress of fluid from one direction and prevent the ingress of fluid from the opposite direction, combined with a casing ported to atmosphere, said check valve means capable of being expanded by liquid pressure to distend a liquid passage provided through said check valve means and of being compressed by atmospheric pressure during the application of vacuum exerted in said liquid passage, so that the effect of atmospheric pressure will open the air ports and close the liquid passage to the flow of fluid therethrough.

Other and further objects of my invention will appear as the construction and operation of the invention is disclosed by the specification and drawing which do not confine the inventor to the specific reduction to practice shown.

Of the drawing:

Fig. 1 is a longitudinal section in elevation of one form of the invention using a special form of body.

Figure 2 is a longitudinal sectional elevation showing a form assembled with a ported fragmentary portion of a conventional tail piece tube and coupling nut.

Fig. 3 is a spider washer adapted to suspend the bell check for assembly of forms shown in Figs. 1 and 2.

Fig. 4 is a longitudinal sectional elevation showing a modified form of pliable check valve having extended lips integral therewith adapted to be assembled with an apron nut and a flanged tubing ported for the ingress of air.

Fig. 5 is a plan view of the top of Fig. 4 with member 7c inserted instead of 7b.

Fig. 6 is an elevation of a modified form of reenforced check valve viewed from the flat side formed by one of a pair of converged lips.

Fig. 7 is an elevation of the flexible sleeve member 7 of Fig. 1.

Like numerals and characters indicate like parts throughout the drawing, the numerals having small letter characters to indicate modifications.

The invention consists of a casing having an inlet 1 and a tubular outlet 2 of Fig. 1 and 2a of Figs. 2 and 4, a liquid passageway 3, a bell check 4 of Fig. 1 and 4a of Fig. 2 preferably made of rubberlike material, attaching means formed by casing 5 having a depending apron 6 as in Figs. 1 and 4 to cover air ports B disposed through the wall of tubular outlet 2 and 2a, respectively, flexible sleeves 7 as in Figs. 1 and 7, 7a in Fig. 2, 7b Fig. 4 and 7c in Fig. 6, all forming flexible check valve means comprising a cylindrical sleeve capable of being expanded to close ports B against the flow of fluid under pressure while flowing through passage 3, likewise flexible lips impinging one another as shown in all the forms illustrated. The exertion of a vacuum in passage 3 causes the flexible sleeve to be forced away from ports B by atmospheric pressure and the lips A to be forced against one another.

In Figs. 1, 2 and 4 oppositely disposed lips are shown impinging one another to prevent the ingress of fluid pressure when exerted from the side external to the passage 3 when the inlet 1 is attached to a source of liquid supply and subjected to vacuum.

Fig. 1 shows the inlet 1 threaded to provide a nut formed by casing 5 which has an external apron projecting downwardly to cover air ports B communicating between atmosphere and air passage C between the outer wall of flanged flexible sleeve 7 which is made of good quality rubber or similar material preferably.

The sleeve 7 is flanged around the upper end and rests upon an inwardly extended grooved retaining flange within the nut portion of the casing 5 which is suitably grooved to receive a bead circumscribing the under side of the outer rim of the upper flanged portion of sleeve 7 which is provided with a flared lower skirt portion F having a feather edge extending radially outward and downward underneath a ridge G extending radially inward below air ports B through the tubular portion of casing 5.

When fluid under pressure is passing from inlet 1 through passage 3 to outlet 2, the cylindrical wall of member 7 is expanded and bulged toward ports B thus tending to raise the lower flange F of the sleeve 7 against the ridge G while the outer lower edge of the bell check member 4 is forced downwardly and at the same time aids in supporting fluid which tends to raise the skirt or flange F against the ridge G during the flow of fluid under pressure through the device. The member 4, preferably made of pliable rubberlike material, is held suspended in position by spider 8 disposed across the top of passage 3. The lip formed by the lower peripheral edge of the bell check 4 is disposed adjacent to the skirt F which forms a marginal lip projecting substantially parallel with the wall of the bell check 4, thus the two marginal lips form a circular slot subject to being opened or closed by fluid pressure from opposite directions. Atmospheric pressure causes the two lips to impinge one another by forcing the wall of member 7 radially inward and the peripheral edge of bell check 4 radially outward and upward when vacuum is exerted from the inlet side of the device.

If any object is lodged between the members 4 and 7 or the lips A the force of atmospheric pressure tends to close the flexible edges around and in conformity with the shape of such objects and seal the device against the ingress of air when subjected to vacuum from the inlet end.

Fig. 2 shows the cylindrical portion of flexible sleeve 7a forming a lip extending for a distance below the edge of bell check 4a and cowl or apron 6 is provided to cover the air ports B which, in this modification, are holes disposed through a flanged tube suspended from within a separate nut forming the inlet 1 of the modified casing 5a. The operation of this form is substantially the same as that of Fig. 1 except when under internal vacuum sleeve 7 is contracted or forced radially inward by atmospheric pressure, while fluid under pressure passing downward through the sleeve 7 causes it to be forced radially outward to close ports B. The modification of Fig. 4 furthermore has the lip elements A bordering each side of the slot D extending transversely of a substantially closed lower end of the member 7b. The slot D is opened by fluid pressure in passage 3 and the wall of member 7b is forced radially outward thereby tending to close air ports B. Should a vacuum be formed in passage 3 the lips A are forced together to close the slot D against the ingress of fluid pressure. A reenforcement E1 in the shape of a metal wire or rod is provided with the ends secured in the opposite sides of the cylindrical wall of member 7b to prevent the lips A from collapsing at their center inwardly and upwardly due to the force of vacuum. The modification of the integral member 7b shown at 7c of Fig. 6 shows a reenforcement E in the shape of a thickened central lip portion which may be used to resist the effect of vacuum to prevent the center of lips from being drawn in and opened, thus serving the same purpose as the rod E1.

Fig. 5 shows the reenforced member of Fig. 6 disposed in the casing 5b. The dotted lines indicate the central reenforcement E which may be made of the same material as the sleeve member 7c. Special attention is called to the fact that the walls of the parallel lips of Fig. 6 and also of Figs. 1 and 4 lie adjacent to one another in a like manner.

Having described and illustrated the three species of my invention, which are classified as the same genera, the following claims are made:

1. A vacuum breaker and valve device comprising, a flanged tubular casing having ports in the wall thereof, and forming an outlet, a coupling nut forming an inlet having an inwardly extended shoulder for engaging beneath the flange of the tubular casing, a flexible tube having a flange resting on the shoulder of the tubular casing and supporting said flexible tube in spaced relation to and opposite said ports of the tubular casing, a flexible diaphragm disposed transversely of the passage of said flexible tube for obstructing flow of pressure fluid in one direction sufficiently to urge the wall thereof into closing relation with said ports, the flexible material of said device providing opposed parallel lips extending toward the outlet and having opposed side walls of sufficient area greater than that presented by the distal end of said lips whereby the walls of said lips are urged toward one another to resist reversal of said lips and flexible tube by atmospheric pressure when a vacuum is formed on the inlet side of the device, a bar element disposed transversely of said flexible tube and lips to further resist the reversal thereof.

2. A vacuum breaker and valve as defined by claim 1 wherein the lips parallel one another on a straight line and are formed integral with the flexible diaphragm.

3. A vacuum breaker and valve as defined by claim 1 wherein the lips parallel one another in concentric relationship, the diaphragm being in the form of a bell and held in position by the transverse bar element with its periphery adjacent to the inner wall of the flexible tube, the bell and the adjacent wall of said flexible tube forming the parallel lips and opposing walls.

JESSE D. LANGDON.